United States Patent Office
2,769,818
Patented Nov. 6, 1956

2,769,818

OXYBIS (PHENYLACETAMIDES)

Arthur H. Schlesinger, Dayton, Ohio, assignor to Monsanto Chemical Company, St. Louis, Mo., a corporation of Delaware No Drawing. Application December 7, 1954,
Serial No. 473,723

12 Claims. (Cl. 260—347.3)

The present invention relates to nitrogenous organic compounds and more particularly provides certain new and valuable diamido ethers and methods of preparing the same.

According to the invention, α,α'-oxybis [N-substituted]-aryl-acetamides are prepared by the condensation of certain arylacetyl halides with certain amino compounds substantially according to the scheme:

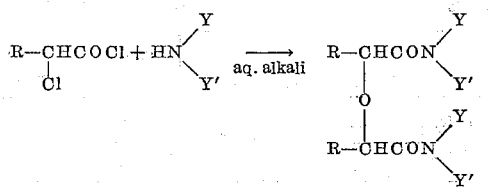

in which R is selected from the class consisting of the phenyl group and a phenyl group having from 1 to 2 substituents selected from the class consisting of alkyl radicals of from 1 to 5 carbon atoms, the nitro radical, and chlorine, Y represents a substituent selected from the class consisting of hydrocarbon radicals of from 1 to 12 carbon atoms, alkoxyalkyl radicals of from 2 to 12 carbon atoms, dialkylaminoalkyl radicals of from 4 to 12 carbon atoms, and the furfuryl radical, Y' is selected from the class consisting of hydrogen and Y, and further members in which Y and Y' taken together with N form a heterocyclic ring structure of from 4 to 9 carbon atoms which ring structure is attached through said N to the remainder of the molecule of which it forms a part.

Acyl chlorides useful for preparing the diamido ethers include α-chlorophenylacetyl chloride and derivatives thereof containing 1 or 2 chloro-, nitro- or alkyl-substituents, e. g., α,4-dichlorophenylacetyl chloride, α-chloro-3-nitrophenylacetyl chloride, α,3,4-trichlorophenylacetyl chloride, α-chloro-2,3-dinitrophenylacetyl chloride, α,3-dichloro-4-nitrophenylacetyl chloride, α-chloro-2-, or 3-, 4-tolylacetyl chloride, α-chloro-3-isoproplyphenylacetyl chloride, α-chloro-4-tert-butylphenylacetyl chloride, α-chloro-4-n-amylphenylacetyl chloride, α-chloro-2,3-dimethylphenylacetyl chloride, α,3-dichloro-4-n-butylphenylacetyl chloride, α-chloro-4-nitro-2-n-propylphenylacetyl chloride, α,4-dichloro-2-tolylacetyl chloride, etc.

One class of amines which react with α-chlorophenylacetyl chloride or the alkyl-, chloro- and/or nitro-derivatives thereof are hydrocarbon amines having from 1 to 2 hydrocarbon radicals of from 1 to 12 carbon atoms each attached to the amino nitrogen atom. The hydrocarbon amine, whether primary or secondary, may be aliphatic, cycloaliphatic, aromatic, or of both aliphatic and aromatic character, either substituted or unsubstituted. Examples of presently suitable hydrocarbon amines are:

Ethylamine
Dimethylamine
N-methylethylamine
Di-n-propylamine
Isobutylamine
Di-n-amylamine
N-ethyl-n-octylamine
n-Hexylamine
Didodecylamine
N-butyl-n-decylamine
Diallylamine
N-methyllalylamine
Di-2-butenylamine
Di-1-dodecenylamine
Dicyclohexylamine
Cyclopentylamine
N-ethylcyclohexylamine
N-butyl-4-methylcyclopentylamine
Aniline
2-, 3- or 4-toluidine
2,3-xylidine
Mesidine
N-ethylamine
Diphenylamine
N-phenylcyclohexylamine
N-phenylallylamine
1-naphthylamine
3-biphenylamine
Benzylamine
Phenethylamine
1-naphthalenemethylamine
N-methylbenzylamine Examples of diamido ethers prepared according to the invention from an appropriate hydrocarbon amine and α-chlorophenylacetyl chloride or the appropriately ar-substituted chloride are the following:

α,α'-Oxybis(N,N-dimethylphenylacetamide)
α,α'-Oxybis(N-amyl-N-phenyl-4-tolylacetamide)
α,α'-Oxybis(N-tert-dodecyl-3-nitrophenylacetamide)
α,α'-Oxybis(N,N-diallyl-4-chlorophenylacetamide)
α,α'-Oxybis(N-cyclohexylphenylacetamide)
α,α' - Oxybis(N,N - dibenzyl - 4 - chloro - 3 - nitrophenylacetamide)
α,α'-Oxybis(N-4-biphenylyl-4-ethylphenylacetamide)
α,α' - Oxybis[N - (2 - phenylethyl) - 2,3 - dimethylphenylacetamide]
α,α'-Oxybis(N-4-tolyl-4-tolylacetamide)
α,α'-Oxybis(N,N-di-2-butenylphenylacetamide)
α,α'-Oxybis(N,N-dicyclohexylphenylacetamide)
α,α'-Oxybis[N-(4-tert-butylphenyl)phenylacetamide]
α,α'-Oxybis(N-propargylphenylacetamide)
α,α' - Oxybis[N,N - bis(2 - ethylhexyl) - 3,4 - dichlorophenylacetamide]
α,α' - Oxybis(N,N - diamyl - 4 - chloro - 3 - ethylphenylacetamide)

Another class of amines which react with the α-chlorophenylacetyl chloride or the present derivatives thereof are alkoxyalkylamines, bis(alkoxyalkyl)amines and mixed secondary amines wherein one of the N-substituents is an alkoxyalkyl radical. Examples of such amines are:

2-methoxyethylamine
Bis(2-ethoxyethyl)amine
N,N-butyl-2-propoxyethylamine
Bis-4-(2-ethylhexyloxy)butylamine
N-cyclohexyl-2-methoxyethylamine
N-benzyl-2-decyloxymethylamine
N-(4-isoamyloxybutyl)allylamine Still another class of presently useful amines includes: N,N-alkylenediamines such as N,N-dimethylethylenediamine, N,N-diamylpropylenediamine, N,N-dibutyl-N'-ethyl-1,3-diamidopropane, etc.

Furfurylamine, difurfurylamine or mixed secondary furfuryl amines react as do the above amines to give the present diamido ethers. Thus, furfurylamine and α-chlorophenylacetyl chloride gives α,α'-oxybis(N-furfurylphenylacetamide), difurfurylamine and α-chloro-4-tolylacetyl chloride gives α,α'-oxybis(N,N-difurfuryl-4-tolylacetamide), N-(2-ethoxyethyl)furfurylamine and α-chloro-4-chlorophenylacetyl chloride gives α,α'-oxybis(N-2-ethoxyethyl-N-furfuryl-4-chlorophenylacetamide) and N-phenylfurfurylamine with 3,4-dichlorophenylacetyl chloride gives α,α' - oxybis(N - amyl-N-furfuryl-3,4-dichlorophenylacetamide).

Heterocyclic nitrogen compounds having an unsubstituted N-hydrogen atom and containing from 4 to 9 carbon atoms react as do the above primary or secondary amines. Thus, α-chlorophenylacetyl chloride and morpholine condense to give α,α'-oxybis-[N-(phenylacetyl)morpholine]; similarly, piperidine and 2-tolylacetyl chloride give α,α'-oxybis[N-(2-tolylacetyl)piperidine]; pyrrole and 4-chlorophenylacetyl chloride give α,α'-oxybis[N-(4-chlorophenylacetyl)pyrrole]; and pyrrolidine with 3-nitrophenylacetyl chloride yields α,α'-oxybis[N-(3-nitrophenylacetyl)pyrrolidine].

Reaction of the acyl chlorides with the primary or secondary amines to yield the present diamido ethers takes place readily by simply mixing the two reactants in aqueous alkaline media and allowing the reaction mixture to stand until the diamido ethers are formed. Depending upon the nature of the individual acyl halide, amine and aqueous alkali, the condensation reaction may occur under varying conditions of temperature and pressure. For optimum yields, it is advantageous in many instances to apply external cooling in order to prevent or to minimize possible side reactions. Aqueous alkaline media which may be employed include alkali metal and alkaline earth metal hydroxides, e. g., sodium, potassium, lithium, calcium or magnesium hydroxide; basically reacting salts thereof such as sodium carbonate, potassium acetate, etc.

Inasmuch as molecular equivalents of the acyl chloride and the primary or secondary amine are involved in the formation of the present condensation product, it is advantageous to employ stoichiometric proportions of these two reactants, as well as of the aqueous alkali. Although an extraneous solvent or diluent is often useful, the reaction may be effected in the absence of such solvents or diluents especially if the temperature of the reaction mixture is controlled by external cooling. Carbon tetrachloride, ether, hexachloroethane, hexane and kerosene are examples of useful diluents. As hereinbefore stated, the optimum temperatures amployed will vary with the individual nature of the reactant and alkaline agent as well as with the presence of any extraneous, inert diluent; but generally they range from, say, minus 20° C. to the refluxing temperature of the reaction mixture.

The present diamido ethers are stable, well-defined products which range from high boiling liquids to crystalline solids. They are generally useful as biological toxicants, particularly as insecticides, fungicides and herbicides.

The present invention is further illustrated, but not limited, by the following examples:

Example 1

Into 150 ml. of carbon tetrachloride there was placed 19.4 g. (0.2 mole) of diallylamine. The resulting mixture was cooled to below minus 10° C. and 42 ml. of a 20% aqueous solution of sodium hydroxide was added to it. α-Chlorophenylacetyl chloride (39.8 g., 0.21 mole) was then added while maintaining the temperature of the mixture at below minus 10° C. After 30 minutes at this temperature, the solution was allowed to attain room temperature. The organic layer which had formed was separated, the aqueous layer washed with carbon tetrachloride and the washings combined with the organic layer. The combined material was then washed with dilute hydrochloric acid, sodium bicarbonate and water. Distillation of the washed material gave 46 g. (88% theoretical yield) of the substantially pure α,α'-oxybis(N,N-diallylphenylacetamide), B. P. 192–198° C./28 mm., $n_D^{25}$ 1.5350, and analyzing as follows:

|  | Found | Calcd. for $C_{26}H_{32}O_3N$ |
| --- | --- | --- |
| Percent C | 75.35 | 75.8 |
| Percent H | 7.68 | 7.22 |

The α,α' - oxybis(N,N - diallylphenylacetamide) was found to give a 100% kill of milkweed bugs (Oncepeltus) at a 1.0% concentration and to inhibit entirely the growth of M. pyogenes var. aureus at an 0.1% concentration.

Example 2

N-furfurylamine (14.5 g., 0.15 mole) was dissolved in 150 ml. carbon tetrachloride, the solution was cooled to below minus 10° C. and first 32 ml. of 20% aqueous sodium hydroxide and then 30 g. (0.16 mole) of α-chlorophenylacetyl chloride were gradually added to the solution while keeping the temperature of the whole at below 10° C. After allowing the resulting reaction mixture to attain room temperature, the precipitate which formed was filtered off and recrystallized from absolute ethanol to give 20 g. of the white, crystalline α,α'-oxybis(N-furfurylphenylacetamide), M. P. 99°–100° C. and analyzing as follows:

|  | Found | Calcd. for $C_{26}H_{24}O_5N_2$ |
| --- | --- | --- |
| Percent C | 71.23 | 70.4 |
| Percent H | 6.09 | 5.41 |
| Percent N | 6.38 | 6.31 |

Example 3

To a cooled (below minus 10° C.) solution of 3-methoxypropylamine there were separately added 26.4 ml. of 20% aqueous sodium hydroxide and 25 g. (0.132 mole) of α-chlorophenylacetyl chloride. During the addition the temperature of the mixture was maintained at below minus 10° C. The whole was then brought to room temperature, stirred for one hour, and allowed to stratify. The organic layer which formed was separated, the aqueous layer was washed twice with carbon tetrachloride, and the combined organic layer and washings washed with 5% hydrochloric acid, then with 5% sodium bicarbonate, and finally with water. After stripping the solvent from the washed material, the residue was distilled under partial vacuum to give 22 g. (73% theoretical yield) of the substantially pure α,α'-oxybis[(N-3-methoxypropyl)phenylacetamide], B. P. 167°–73° C./3 mm., $n_D^{25}$ 1.5257, and analyzing as follows:

|  | Found | Calcd. for $C_{24}H_{34}N_2O_5$ |
| --- | --- | --- |
| Percent C | 68.08 | 67.4 |
| Percent H | 7.74 | 7.48 |
| Percent N | 6.47 | 6.55 |

The α,α' - oxybis[(N - 3-methoxypropyl)phenylacetamide] was found to be very effective against the 2-spotted mite at an 0.2% concentration.

Example 4

This example describes the reaction of N,N-diethyl-1,3-propanediamine with α-chlorophenylacetyl chloride.

A solution of 19.5 g. (0.15 mole) of the diamine in 100 ml. of carbon tetrachloride was cooled to below minus 10° C. and, while maintaining this temperature, there was then added separately, during 30 minutes, 32 ml. of 20% aqueous sodium hydroxide and 30 g. (0.16 mole) of the acyl chloride. Cooling was discontinued and the mixture was stirred until it had attained room temperature. The organic layer which formed was separated and combined with carbon tetrachloride washings of the aqueous layer. Distillation of the combined material gave 24 g. of the substantially pure α,α'-oxybis[N-(3-diethylaminopropyl)phenylacetamide], B. P. 185–192° C./3 mm., $n_D^{25}$ 1.5182, and analyzing as follows:

|  | Found | Calcd. for $C_{30}H_{46}O_2N_4$ |
|---|---|---|
| Percent C | 70.79 | 70.5 |
| Percent H | 9.51 | 9.01 |
| Percent N | 10.70 | 11.00 |

The α,α'-oxybis[N-3-(diethylaminopropyl)phenylacetamide] is very effective against Mexican bean beetle larvae at an 0.2% concentration.

Example 5

This example describes the condensation of morpholine with α-chlorophenylacetyl chloride.

To a cooled solution of 8.7 g. (0.10 mole) of morpholine in 150 ml. of carbon tetrachloride there was added, while keeping the temperature of the solution at below minus 10° C., first 22 ml. of 20% aqueous sodium hydroxide and then 20.8 g. (0.11 mole) of the acyl chloride. The whole was then allowed to attain room temperature. The organic layer which formed was separated, the aqueous layer washed twice with carbon tetrachloride and the organic material and washings combined. Washing of the combined material first with dilute hydrochloric acid, then with dilute sodium bicarbonate and finally with water, and removal of the solvents from the washed product gave a solid which upon recrystallization from ether gave 16 g. (67% yield) of the substantially pure α,α'-oxybis[N-(phenylacetyl)morpholine], white needles, M. P. 70–71° C. and analyzing 6.59% N, as against 6.62% N, the calculated value for $C_{24}H_{28}O_5N_2$.

Example 6

To a solution of 10 g. (0.10 mole) of cyclohexylamine in 150 ml. of carbon tetrachloride maintained at minus 10° C. there were separately added, over a 20 minute period, 21.3 ml. (0.106 mole) of aqueous sodium hydroxide and 20 g. (0.106 mole) of phenylacetyl chloride. The solid which formed upon allowing the reaction mixture to come to room temperature was filtered off, and the organic layer which formed in the filtrate was separated, and vacuum evaporated to a solid. Purification of the combined solids was effected by dissolving in boiling methanol and cooling. There was thus obtained 20 g. of the white, crystalline α,α'-oxybis(N-cyclohexylphenylacetamide), M. P. 139–148° C., and analyzing as follows:

|  | Found | Calcd. for $C_{28}H_{36}O_2N_2$ |
|---|---|---|
| Percent C | 75.62 | 75.2 |
| Percent H | 8.17 | 8.03 |
| Percent N | 6.16 | 6.25 |

The α,α'-oxybis(N-cyclohexylphenylacetamide) was found to be effective against the fungus *Stemphyllium sarcinaeform* at a concentration of 100 p. p. m. in spore germination tests.

Example 7

A solution consisting of 10 g. (0.078 mole) of diisobutylamine in 100 ml. of carbon tetrachloride was cooled to minus 10° C. and there was added to it consecutively during a time of 20 minutes 16 ml. of 20% aqueous sodium hydroxide and 15 g. (0.08 mole) of α-chlorophenylacetyl chloride. During the addition the temperature of the mixture was kept at below minus 10° C. It was then allowed to attain room temperature. The organic layer was separated, the aqueous layer was twice washed with carbon tetrachloride, and the washings and organic layer combined. After washing the combined material with dilute hydrochloric acid, aqueous sodium bicarbonate, and water, it was distilled in vacuo to give 16 g. (74% yield) of the substantially pure α,α'-oxybis(N,N-diisobutylphenylacetamide), B. P. 152–157° C./3 mm., $n_D^{25}$ 1.5042, and analyzing as follows:

|  | Found | Calcd. for $C_{32}H_{48}N_2O_2$ |
|---|---|---|
| Percent C | 76.85 | 75.6 |
| Percent H | 9.69 | 9.46 |

This product was found to possess a severe effect against broadleafed plants when sprayed thereon in an 0.5% concentration.

Example 8

To a solution of 4.4 g. (0.6 mole) of tert-butylamine in 100 ml. of carbon tetrachloride there was added separately and with cooling 13 ml. of 20% aqueous sodium hydroxide and 12 g. (.064 mole) of phenylacetyl chloride. During the addition the reaction mixture was maintained at below minus 10° C. It was then allowed to attain room temperature. The organic layer which formed was separated and washed consecutively with dilute hydrochloric acid, dilute aqueous sodium bicarbonate and water. Removal of the solvent from the washed product by distillation in vacuo gave a white, solid residue. It was recrystallized from ether to yield α,α'-oxybis(N-tert-butylphenylacetamide), white needles, M. P. 116–117° C., and analyzing 7.14% N as against 7.14%, the calculated value for $C_{24}H_{32}O_2N_2$.

What I claim is:

1. An amido ether having the formula

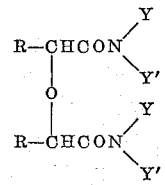

in which R is selected from the class consisting of the phenyl group and a phenyl group having from 1 to 2 substituents selected from the class consisting of alkyl radicals of from 1 to 5 carbon atoms, the nitro radical, and chlorine, Y taken separately represents a substituent selected from the class consisting of hydrocarbon radicals of from 1 to 12 carbon atoms, alkoxyalkyl radicals of from 2 to 12 carbon atoms, dialkylaminoalkyl radicals of from 4 to 12 carbon atoms, and the furfuryl radical, Y' taken separately is selected from the class consisting of hydrogen and Y, and Y and Y' taken together with N form a heterocyclic ring structure of from 4 to 5 carbon atoms which ring structure is attached through said N to the remainder of the molecule of which it forms a part.

2. α,α'-Oxybis(N,N-diallylphenylacetamide).
3. α,α-Oxybis(N-furfurylphenylacetamide).
4. α,α-Oxybis[(N-3-methoxypropyl)phenylacetamide].
5. α,α'-Oxybis[N-(3-diethylaminopropyl)phenylacetamide].
6. α,α-Oxybis(N,N-diisobutylphenylacetamide).

7. The method which comprises contacting in the presence of aqueous alkali, an acyl halide having the formula

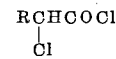

in which R is selected from the class consisting of the phenyl group and a phenyl group having from 1 to 2 substituents selected from the class consisting of alkyl radicals of from 1 to 5 carbon atoms, the nitro radical and chloride, with an amino compound having the formula

in which Y taken separately represents a substituent selected from the class consisting of hydrocarbon radicals of from 1 to 12 carbon atoms, alkoxyalkyl radicals of from 2 to 12 carbon atoms, dialkylaminoalkyl radicals of from 4 to 12 carbon atoms, and the furfuryl radical, Y' taken separately is selected from the class consisting of hydrogen and Y, and Y and Y' taken together with N form a heterocyclic ring structure of from 4 to 5 carbon atoms which ring structure is attached through said N to the remainder of the molecule of which it forms a part, and recovering from the resulting reaction product an amido ether having the formula

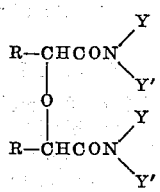

in which R is selected from the class consisting of the phenyl group and a phenyl group having from 1 to 2 substituents selected from the class consisting of alkyl radicals of from 1 to 5 carbon atoms, the nitro radical and chlorine, Y taken separately represents a substituent selected from the class consisting of hydrocarbon radicals of from 1 to 12 carbon atoms, alkoxyalkyl radicals of from 2 to 12 carbon atoms, dialkylaminoalkyl radicals of from 4 to 12 carbon atoms, and the furfuryl radical, Y' taken separately is selected from the class consisting of hydrogen and Y, and Y and Y' taken together with N form a heterocyclic ring structure of from 4 to 5 carbon atoms which ring structure is attached through said N to the remainder of the molecule of which it forms a part.

8. The method which comprises contacting, in the presence of aqueous alkali, α-chlorophenylacetyl chloride with diallylamine, in the presence of an aqueous solution of an alkali metal hydroxide and recovering from the resulting reaction product an α,α'-oxybis(N,N-diallylphenylacetamide).

9. The method which comprises contacting α-chlorophenylacetyl chloride with N-furfurylamine in the presence of an aqueous solution of an alkali metal hydroxide and recovering from the resulting reaction product an α,α'-oxybis (N-furfurylphenylacetamide).

10. The method which comprises contacting α-chlorophenylacetyl chloride with 3-methoxypropylamine, in the presence of an aqueous solution of an alkali metal hydroxide and recovering from the resulting reaction product α,α'-oxybis[(N-3-methoxypropyl)phenylacetamide].

11. The method which comprises contacting α-chlorophenylacetyl chloride with N,N-diethyl-1,3-propanediamine, in the presence of an aqueous solution of an alkali metal hydroxide and recovering from the resulting reaction product α,α'-oxybis[N-(3-diethylaminopropyl)phenylacetamide].

12. The method which comprises contacting α-chlorophenylacetyl chloride with diisobutylamine, in the presence of an aqueous solution of an alkali metal hydroxide and recovering from the resulting reaction product α,α'-oxybis(N,N-diisobutylphenylacetamide).

No references cited.